3,483,136
CATALYSTS
Franciscus J. F. van der Plas and Karel H. Fleurke, Amsterdam, Netherlands, assignors to Shell Oil Company, New York, N.Y., a corporation of Delaware
No Drawing, Filed Jan. 12, 1968, Ser. No. 697,300
Claims priority, application Great Britain, Jan. 23, 1967, 3,343/67
Int. Cl. B01j *11/80*
U.S. Cl. 252—441                                                     10 Claims

ABSTRACT OF THE DISCLOSURE

Catalysts having improved fluidization characteristics are obtained by impregnating a catalyst support, while in a fluidized state, first with a catalyst solution, thereafter with catalyst-free solvent, and drying between impregnations. An example of such a catalyst comprises chlorides of copper, alkali metal and a rare earth metal on a silica support.

---

The present invention relates to a process for the preparation of supported catalysts having improved fluidization characteristics.

A method for the preparation of supported catalysts by impregnation of a fluidized support is disclosed in U.S. Patent 2,865,868. Catalysts prepared by methods disclosed heretofore, however, often have inherent therein characteristics detracting materially from efficient utilization in fluidized systems.

It is therefore an object of the present invention to provide a process enabling the efficient production of a supported catalyst having substantially improved fluidization characteristics. The process of the invention has the further advantage in that it results in deeper penetration of active substances into the pores of the carriers.

In accordance with the invention the novel supported catalysts having improved fluidization characteristics are obtained by:

(A) Impregnating a finely divided catalyst support while in a fluidized state with a catalytically active material in a solvent for said catalytically active material in a first impregnation stage, (B) Removing at least a substantial amount of said solvent from the resulting impregnated support in a first drying stage, (C) Re-impregnating said dried impregnated support while in a fluidized state with additional solvent free of any substantial amount of catalytically active material in a second impregnation stage, and (D) Removing at least a substantial amount of solvent from said re-impregnated support in a second drying stage.

The solvent added in the second impregnation need not be the same solvent as that used in the first impregnation stage but it too should possess appreciable ability to dissolve the catalytically active material added in the first impregnation stage. Both the first and second impregnation stage are executed at temperatures which are below the boiling temperature of the impregnating liquids at the prevailing temperatures employed.

As stated hereinbefore, it is a critical feature of this invention that the carriers are kept in the fluidized state during their impregnation with the respective solutions and solvents. This limits the amount of the various impregnation liquids to be used, since in practice it is in point of fact impossible to load fluidized carrier particles with volumes of liquid exceeding 99% of the pore volume of the carrier without seriously disturbing the fluidizability of the carrier particles. However, also when the carriers are loaded with volumes of liquid which are only slightly below this maximum value, the loaded carrier particles tend to form agglomerates which may affect the desired favorable fluidization characteristics of the carrier particles adversely. In order to counteract this tendency, the carriers should preferably be loaded with volumes of liquid which do not exceed 95% of the pore volume of the carriers.

The process has proved to be particularly effective when the amounts of catalyst solution and of additional solvent added in each stage are controlled so that at the end of each treatment the volume of liquid adsorbed by the carriers is at least 80% of their pore volumes. Reduction of this percentage to below 80% in the catalyst solution impregnation stage causes a noticeable decrease in catalytic activity. Reducing the volume of the adsorbed solvent to values lower than 80% in the second impregnation stage also decreases to some extent the desirable characteristics of the finished catalyst. In the present description "pore volume of the carrier" means the maximum volumes of liquid which can be taken up by non-fluidized carrier with stirring while free mobility of the carrier particles relative to each other is maintained.

In the first impregnation stage, impregnation of the carrier with the solution of catalytically active substance may be carried out in a single or in several steps, preferably not more than four steps, however. The same applies for the second-stage impregnation with additional solvent. In stepwise impregnation with the catalyst solution, the amounts of solvent and of catalytically active substance in the solution used in the separate consecutive steps may be the same or may vary.

When stepwise impregnation is resorted to in the first and/or second impregnation stage of the process, their sequence may be varied at will. Thus a series of successive catalyst solution impregnation steps may precede the second-stage impregnation with additional catalyst-free solvent. However, stepwise impregnation is preferably effected so that each impregnation with catalyst solution alternates with an impregnation with catalyst-free solvent.

Whenever use is made of multi-step impregnation, it is generally recommended to subject the impregnated carriers to a drying treatment between each of these steps in order to remove at least part of the liquid adsorbed by the carriers. Although these drying treatments may even lead to substantially complete removal of the adsorbed liquids, it is often more favorable to have a noticeable proportion of liquid, e.g. from 10 to 30%, in the pores of the carrier before subjecting the carriers to further impregnation.

It will be clear that the drying of the carriers cannot be omitted in one particular embodiment of this invention, i.e. the embodiment using a one-step first-stage impregnation and a one-step second-stage impregnation. This embodiment is a preferred method of carrying out the present process, especially when the amounts of the impregnation liquids used in each of the two steps are above the minimum value specified hereinbefore. This mode has proved to be the most rapid and most effective way of preparing catalysts having substantially improved fluidization characteristics combined with appropriate activities.

The drying stages are carried out by conventional methods, for example, by the application of a preheated gas stream, by the application of reduced pressure, or by a combination of such steps. Drying is preferably carried out with the carrier particles in the fluidized state. Impregnation and drying may be carried out in one and the same fluidized bed in successive operations. It may, however, at times be more convenient to use different fluidized bed zones for impregnation and drying, especially whenever the process of the invention is carried out continuously.

The temperature employed during drying is generally not critical, provided excessively rapid evaporation conducive to extreme turbulence in the fluidized bed is avoided. For most impregnation liquids, the drying temperature should remain below about 300° C. When the catalyst solution and additional solvent comprise water, the drying temperature is preferably maintained below about 200° C.

Temperatures used in the impregnation stages should be such that any substantial evaporation of the impregnation liquids is avoided. Generally acceptable impregnation temperatures range from about room temperature to a temperature which is at least 5° C., preferably at least 15° C., below the boiling point of the respective solvent.

Liquids which function as the additional solvent added during the second impregnation stage of the process may be any liquid wherein the catalytically active substances added in the first impregnation stage are also readily soluble, i.e. in concentrations above 10, preferably above 50 g./liter. Although the liquid added in the second impregnation stage may have present therein small amounts of catalytically active substances, it should be noted that they are clearly distinguished from the catalyst solution added in the first impregnation stage in that the amounts, if any, of catalytically active substances therein should at all times be so small that they can increase the catalytically active substance content of the carrier by at most 25% and preferably by at most 10% (based on the contact obtained in the first stage impregnation). Although the presence of small amounts of catalytically active substances can be tolerated in the additional solvent added in the second impregnation stage, it is preferred that these solvents do not contain any of such catalytically active substances.

Suitable catalytically active substances which can be used in the process of this invention comprise those described in the U.S. patent specification 2,865,868. Generally, these substances will be added to the carriers in the first impregnation stage of the process in the form of aqueous solutions, in which case the most convenient solvent used in the subsequent second impregnation stage is preferably also water. However, the invention is not limited to the use of aqueous solutions and water as impregnation liquids; other solvents, for example organic solvents such as alcohols, ketones, ethers, amides or nitriles, may be used both as constituents of the solutions of catalytically active substances added in the first impregnation stage and as the relevant impregnation solvent used in the second impregnation stage.

The invention is particularly useful in the preparation of catalysts containing compounds, in particular chlorides, of copper and alkali metals to be used for the preparation of chlorine by oxidation of hydrogen chloride or for the production of chlorinated hydrocarbons by the oxychlorination of hydrocarbons. Especially preferred catalysts are those which, in addition to the said metal compounds, contain one or more compounds, in particular chlorides of rare earth metals, such catalysts being described in greater detail in the U.K. Patents 908,022 and 907,435. In these cases, too, the respective impregnations of the process described herein are most conveniently carried out with aqueous solutions and water, respectively.

The carriers can be any of the porous carriers conventionally used for the preparation of impregnated catalysts, for example, oxides of aluminum or silicon, such as alpha- or gamma-alumina, silica gel, pumice, diatomaceous earth, and the like. Silica gel is a preferred carrier, especially for the preparation of impregnated catalysts to be applied in the oxidation of hydrogen chloride to chlorine and in the oxychlorination of hydrocarbons.

When the carriers have been impregnated as described hereinbefore, they will as a rule be dried, at least partially, but more preferably completely, before being used in practice. This drying may be combined with conventional calcination or activation treatments if desired.

The catalysts obtained by the present invention, themselves, as well as the use of these catalysts in chemical reactions, is comprised within the scope of this invention. Such chemical reactions comprise hydrogenation, dehydrogenation, cracking, hydrocracking, hydrodesulfurization, halogenation, olefin disproportionation, oxidation and oxyhalogenation reactions and any other type of reaction selected from the many processes known in the chemical and petrochemical industries which involve the use of impregnated catalysts in the fluidized state.

The catalysts obtained by the novel process described proved to be eminently suitable when applied in the form of a fluidized bed, in particular in the fluidized-bed processes for preparing chlorine and chlorinated hydrocarbons described in U.K. Patents 908,022 and 907,435. It should be noted that the application of the catalysts of this invention in chemical reactions is by no means limited to the use in fluidized beds; also the use of solid beds composed of powders, pellets or granules of the novel impregnated catalysts is possible. Here the very uniform distribution of the catalytically active substances on the carrier has proved to be very advantageous.

Example I

Five liters (2.5 kg.) of a particulate silica gel having a surface area of 410 m.$^2$/g. and a pore volume of 0.72 ml./g. and containing less than 1.0% w. of water were introduced into a cylindrical glass tube, 10 cm. in diameter and 200 cm. long. The bottom of this tube consisted of a flat, porous sintered glass plate; the tube was provided with electric heating elements. The silica was fluidized at 25° C. by introducing air through the porous bottom into the tube; the linear gas velocity in the tube was 10 cm./sec., corrected for the volume of the silica gel. At a constant rate of 1.3 l./hr., 1.625 l. of an aqueous solution containing per liter 231 g. CuCl$_2$.2 aq., 224 g. DiCl$_3$.6 aq. (wherein Di stands for didymium), and 98 g. KCl was sprayed on the fluidized bed through a feed tube, the end of which was a distance of 20 cm. from the top of the fluidized bed. In this manner 90% of the pore volume of the carrier was filled with impregnation liquid. After the impregnation, fluidization of the catalyst was continued for two hours at the same gas velocity and the same temperature.

Next, the catalyst was dried by heating the bed to a temperature of 120° C. followed by gradually increasing the temperature to a final value of 160° C. At the end of this drying treatment, during which the catalyst remained in the fluidized condition, the catalyst contained about 10 percent w. of water.

Subsequently, the temperature of the bed was lowered to 25° C. and the fluidized catalyst was impregnated by introducing water through the liquid inlet tube at a constant rate of 1.4 l./hr. until 90% of the pore volume of the catalyst was filled with water. After this impregnation, fluidization was continued for two hours at the same temperature.

Finally, the catalyst was dried in the fluidized state at a temperature of 160° C. for a period of four hours. After cooling, the catalyst was ready. Its composition was 5 Cu=5 Di=3 K=87 SiO$_2$. The metal contents are given here as percentages by weight of metal, based on the total amounts of metals and carrier.

Example II

The impregnation with the aqueous solutions containing the chlorides of copper, didymium and potassium and the first drying treatment was repeated under conditions identical with those described in Example I. Thereafter, the impregnation with water was carried out in two successive steps, in each step the water being fed in at a rate of 1.4 l./hr. but just enough water being used to fill out 45% of the pore volume of the fluidized catalyst with liquid. Between the first and the second impregnations with water, the catalyst was dried in the fluidized state until the water content of the catalyst had been reduced to less than 10% w. After the second impregnation with water, the drying treatment was effected at 160° C. for a period of four hours.

Example III

The procedure described in Example I was repeated under identical conditions except for the impregnation with the aqueous solutions containing the catalytically active chlorides. The impregnation was now carried out in two successive steps, in each step 90% of the pores of the fluidized silica being filled with a solution containing 115.5 g. $CuCl_2.2$ aq., 112 g. $DiCl_3.6$ aq., and 49 g. KCl. In each case these solutions were added at a constant rate of 1.3 l./hr. Between these impregnations, the catalyst was partially dried as described in Example II.

Example IV

Example I was repeated under identical conditions except for the temperature of the fluid bed, which during the impregnation with active solution and during the impregnation with water was kept at 70° C.

Example V

This example, as well as Example VI and VII, are given for the purpose of comparison only, the procedure not being in accordance with the invention.

Five liters of fluidized silica were impregnated with the same aqueous solution and under the same conditions as described in Example I. After this impregnation the catalyst was kept in fluidized state for two hours and dried by heating the fluidized bed to 160° C. for four hours. After cooling, the catalyst was ready.

Example VI

The impregnation of the fluidized silica with the aqueous solution was effected in two successive steps as described in Example III. After these steps, the catalyst was heated as described in Example V.

Example VII

The procedure of Example V was repeated under identical conditions except for the impregnation with the aqueous solution. This impregnation was now carried out in two successive steps while in each step only 45% of the pores of the carriers was filled. The concentration of the chlorides in this solution and the impregnation rate were as described in Example I. Between these impregnation steps, the catalyst was partially dried until the water content was reduced to less than 10%. After the second impregnation, the catalyst was treated as described in Example V.

Example VIII

The catalysts prepared in Examples I–VII, which all had the same composition (5 Cu=5 Di=5 K=87 $SiO_2$), were subjected to a comparative microscopic examination. This showed that a certain percentage of the total number of carrier particles contained only little, if any, active material; these particles were considered to be inactive particles. Additionally, the catalysts were inspected for the presence of salt agglomerates on the surface of the carrier particles. The results of these examinations and the essential distinguishing features of the impregnation techniques applied are listed in Table I.

TABLE I

| | Impregnation with Solution | | | Impregnation with Water | | Quality of Catalyst | |
|---|---|---|---|---|---|---|---|
| | Method | Solution | Amount [1] | Method | Amount [1] | Active particles, percent | Agglomerates |
| Example: | | | | | | | |
| I | One step | Concentrated | 90 | One step | 90 | 93 | None. |
| II | do | do | 90 | Two steps | 45 | 93 | Very little. |
| III | Two steps | Dilute | 90 | One step | 90 | 96 | None. |
| IV | One step | Concentrated | 90 | do | 90 | 90 | Do. |
| V [2] | do | do | 90 | | | 75 | Many. |
| VI [2] | Two steps | Dilute | 90 | | | 80 | Some. |
| VII [2] | do | Concentrated | 45 | | | 65 | Many. |

[1] Amount of liquid used per step, percent of pore volume.
[2] For comparison.

These results illustrated that the catalysts obtained by the process of this invention are much more homogeneously impregnated with the catalytically active chlorides than those obtained without subsequent impregnation with water.

Example IX

The activity of the catalyst prepared in Example I was compared with those of the catalysts of Examples V and VI in the oxychlorination of ethylene, carried out in a fluidized bed.

The reactor was a glass tube having a diameter of 5 cm. and a length of 250 cm., surrounded by an insulation and electric heating elements in order to maintain the required reaction temperature in the fluidized bed. The gas mixtures were heated to the reaction temperature by a preheater and passed through the reactor with a linear gas velocity of 5 cm./sec. At this velocity the height of the expanded fluidized bed in the tube amounted to 150 cm. The gas introduced into the tube was a mixture of ethylene, hydrogen chloride and air. The $C_2H_4$: $HCl:O_2$ molar ratios in this mixture were 2.0:4.0:1.05. At a reaction temperature of 285° C. the following results were obtained:

TABLE II

| | Catalyst of Example I | Catalyst of Example V | Catalyst of Example VI |
|---|---|---|---|
| Conversion of ethylene, percent m | 92 | 85 | 86 |
| Yield of 1,2-dichloroethane, percent m | 98 | 95 | 95 |
| Losses to CO and $CO_2$, percent m | 1.1 | 2 | 1.8 |

In this table the yield of dischloroethane and the losses through combustion of ethylene have been calculated on the amount of converted ethylene, thus being an indication of the selectivity of the reaction.

During these experiments it was additionally observed that the fluidizability of the catalyst of this invention proved to be excellent, the top of the fluidized bed periodically varying in height by values of only ±5%. The other catalysts showed a significantly less favorable fluidizability, the periodic variations of the bed expansion in these two cases having values of ±15%. Apart from this, the latter two beds showed a strong tendency to "plugging," which points to serious interference of the appropriate fluidized state locally in the bed and which manifests itself by the formation of rather large gas bubbles moving in an upward direction through the bed. No tendency to plugging was displayed by the catalyst prepared by the process of this invention.

Example X

The catalysts prepared in Examples I and V were subjected to comparative experiments in the oxidation of hydrogen chloride at a temperature of 385° C., in a fluidized bed of 30 cm. diameter and a bed height of 500 cm. A stoichiometric mixture of air and hydrogen chloride was passed through the bed with a linear velocity of 20 cm./sec. At these conditions the conversion of hydrogen chloride into chlorine with the comparative catalyst proved to be 7.2% lower than that obtained with the catalyst of this invention. After a reaction period of 500 hours, the copper content of the comparative catalyst proved to be 8.9% lower than the original value. In contradiction thereto the catalyst of this invention gave a deterioration of the copper content of only 1.1% over the same period.

We claim as our invention:

1. The process for the preparation of supported catalysts having improved fluidization characteristics comprising
    (A) impregnating a finely divided catalyst support while in a fluidized state with a catalytically active material in a solvent for said material in a first impregnation stage,
    (B) removing at least a substantial amount of said solvent from the resulting impregnated support in a first drying stage,
    (C) re-impregnating said dried impregnated support while in a fluidized state with an additional amount of solvent free of any substantial amount of catalytically active material in a second impregnation stage, and
    (D) removing at least a substantial amount of solvent from said re-impregnated support in a second drying stage.

2. The process in accordance with claim 1 wherein said first and second drying stages are executed while maintaining the impregnated catalyst support in fluidized state.

3. The process in accordance with claim 2 wherein said drying is executed at a temperature below about 300° C.

4. The process in accordance with claim 3 wherein said solvent is water.

5. The process in accordance with claim 4 wherein said catalyst support is silica gel.

6. The process in accordance with claim 5 wherein said drying is executed at a temperature below about 200° C.

7. The process in accordance with claim 6 wherein said first impregnation stage comprises a plurality of separate consecutive impregnations.

8. The process in accordance with claim 6 wherein the amount of solvent added during said impregnations is controlled to result in an impregnated support wherein the volume of liquid which is absorbed by the support is between about 80 and 95% of its pore volume.

9. The process in accordance with claim 6 wherein the catalytically active material comprises a compound of copper, alkali metal and a rare earth metal.

10. The process in accordance with claim 9 wherein said compounds are chlorides.

References Cited

UNITED STATES PATENTS

| | | | |
|---|---|---|---|
| 2,741,602 | 4/1956 | McKinley et al. | 252—410 |
| 2,786,801 | 3/1957 | McKinley et al. | 252—410 XR |
| 2,865,868 | 12/1958 | McKinley et al. | 252—472 XR |

PATRICK P. GARVIN, Primary Examiner

U.S. Cl. X.R.

23—219; 252—410, 449